Sept. 20, 1955 W. B. McLEAN 2,718,603
REFERENCE VOLTAGE GENERATOR
Filed April 21, 1953

INVENTOR.
WILLIAM B. MC LEAN
BY
G. D. O'Brien
E. C. Walsh
ATTORNEYS

United States Patent Office 2,718,603
Patented Sept. 20, 1955

2,718,603
REFERENCE VOLTAGE GENERATOR

William B. McLean, Inyokern, Calif., assignor to the United States of America as represented by the Secretary of the Navy Application April 21, 1953, Serial No. 350,274

8 Claims. (Cl. 310—155)

(Granted under Title 35, U. S. Code (1952), sec. 266)

The invention described herein may be manufactured and used by or for the Government of the United States of America for governmental purposes without the payment of any royalties thereon or therefor.

This invention relates to an A. C. generator and in particular to an A. C. reference voltage generator of the variable reluctance type.

In the guidance system of some missiles it is desirable to determine at any instant of time the angular position of a point, such as the projection of a target on the plane of rotation of a rotating element with respect to a reference point which is the intersection of the axis of rotation of the element with the plane of rotation. To do this, it is necessary to determine the instantaneous angular position of the rotating element. One manner in which the angular position of the rotating element can be determined is by forming a number of teeth in a portion of the periphery of the element. A plurality of permanent magnets is then spaced uniformly around the periphery of the element with the poles of the magnets being near the element. When teeth on the element are closest to the poles of one of the magnets a magnetic circuit of relatively low reluctance is completed through the teeth and the element. As the teeth move relative to the poles of the magnet the reluctance of the circuit increases to a maximum when the air gap between the teeth and the poles is at a maximum. The variation in the magnetic flux due to the variation in the reluctance of the magnetic circuit will induce an E. M. F. in a pickup, or signal, coil located around the magnet. By a suitable choice of the number and location of pickup coils and the number and spacing of the teeth on the element, the instantaneous position of the rotating element can be determined.

There is one serious defect in variable reluctance A. C. generators of the type described and that is that only a small E. M. F. is generated in the pickup coil because of the hysteresis of the permanent magnet. If a strong permanent magnet is used, the flux will drop only slightly due to its high retentivity. If a weak magnet is chosen, it will have not only a lower retentivity, but also a lower maximum flux in the position of minimum reluctance. A compromise is, therefore, necessary.

The E. M. F. generated in the pickup coils can be increased by increasing the number of turns of the conductor in the coil, but this has the disadvantage of increasing the weight and volume occupied by the device while simultaneously increasing the internal impedance of the coil.

It is therefore an object of this invention to provide a variable reluctance A. C. generator which has less weight and which generates a higher voltage than previously known reluctance generators.

It is a further object of this invention to provide an A. C. reluctance generator in which the magnetic field through the pickup, or signal, coils reverses, thus allowing the use of strong permanent magnets to maintain the total available field and yet providing for a shift in direction of this field through the signal coils as the teeth pass the magnet structure.

Other objects and many of the attendant advantages of this invention will be readily appreciated as the same becomes better understood by reference to the following detailed description when considered in connection with the accompanying drawings wherein.

Figures 1, 1A:
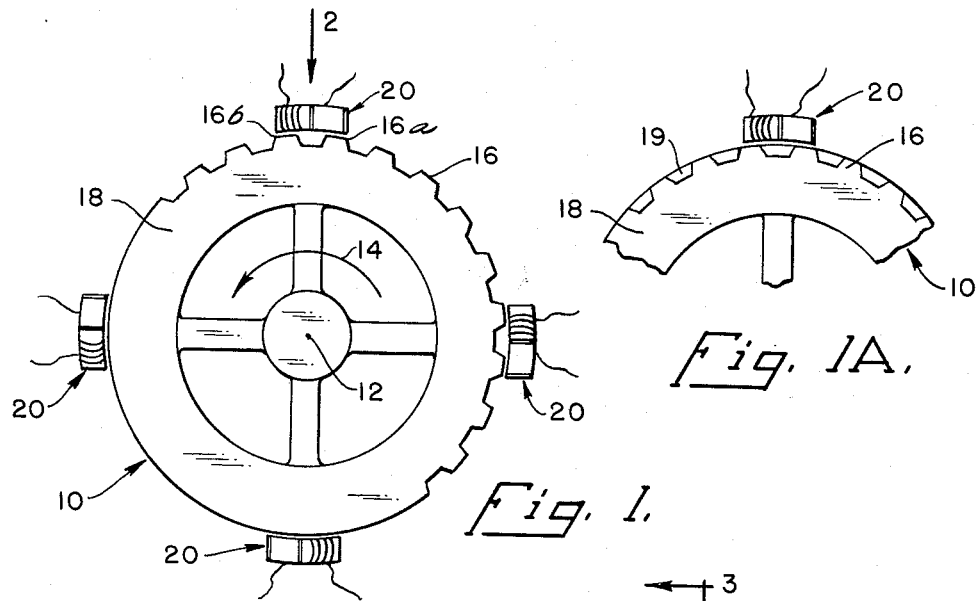
Fig. 1 is a side elevation of one form of the subject invention.
Fig. 1A is a fragmentary view similar to Fig. 1, but showing a modification of the invention.
Figures 2, 2A:
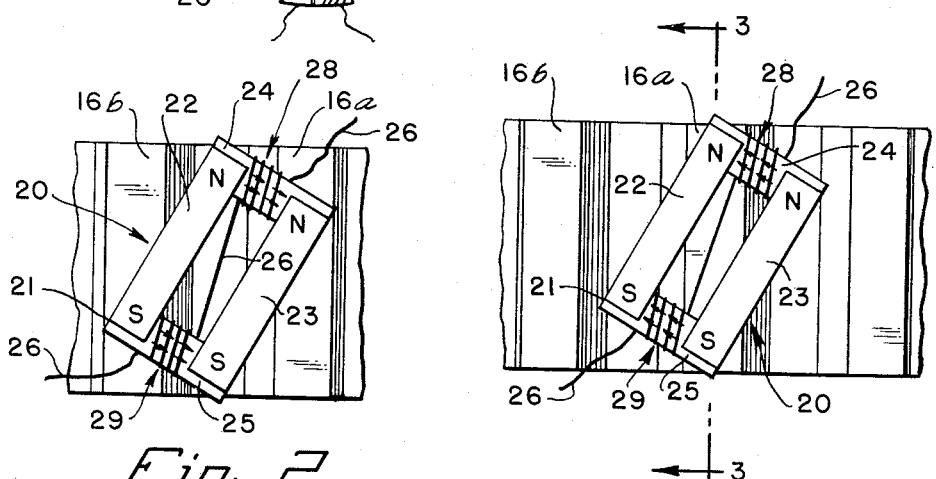
Fig. 2 is an enlarged fragmentary view in the direction of arrow 2 in Fig. 1.
Fig. 2A is a view similar to Fig. 2 with the relative positions of the elements slightly changed.
Figure 3:
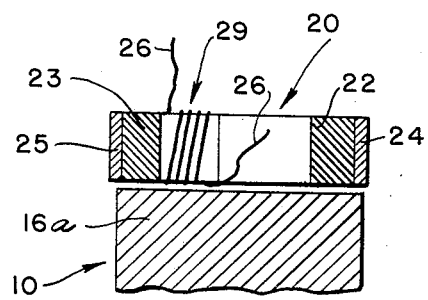
Fig. 3 is a sectional view taken along line 3—3 of Fig. 2A.

The A. C. reference signal generator, illustrated in Fig. 1, comprises a movable member, or wheel, 10 which is rotated about axis of rotation 12 in the direction indicated by arrow 14. A plurality of equiangularly spaced teeth 16 are formed in the circular peripheral portion, or rim, 18 of wheel 10 and extend transversely of rim 18, as seen in Figs. 2 and 2A. The rim 18 in which teeth 16 are formed is made of a soft, or non-permanent, magnetic, or ferromagnetic, material. It may be found advantageous to fill the spaces between teeth 16 with a suitable nonmagnetic material 19, such as lead or aluminum, as shown in Fig. 1A, to help statically and dynamically balance wheel 10, and to reduce windage losses produced by teeth 16 when wheel 12 is rotated.

A plurality of equiangularly spaced stator members 20 are fixedly mounted around wheel 10, in the plane of rotation of wheel 10 so that they are as close to the periphery of wheel 10 as is physically possible, but not touching wheel 10. Each stator member 20 has a magnetic assembly, or frame, 21 made of two permanent magnets 22, 23 and two bars 24, 25 which are made of a soft ferromagnetic material. Bar 24 connects the north poles of magnets 22, 23 while bar 25 connects the south poles of magnets 22, 23. An insulated conductor 26 is wound around bars 24, 25 to form pickup, or signal, coils 28, 29.

Figs. 2 and 2A illustrate the theory of operation of the invention. In Fig. 2 one of the teeth 16, such as tooth 16a, is shown as being under the north pole of magnet 23 of assembly 21, or as close to the pole as it approaches. At the same time an adjacent tooth 16b underlies the south pole of magnet 22. The magnetic circuit of magnet 22 extends from its north pole, through bar 24, tooth 16a, rim 18 and tooth 16b to its south pole. The magnetic circuit of magnet 23 extends from its north pole through tooth 16a, rim 18, tooth 16b, and bar 25 to its south pole. The direction of flow of the lines of flux in bars 24, 25 is illustrated by arrows in Fig. 2.

As wheel 10 moves from right to left from the position shown in Fig. 2, to the position shown in Fig. 2A, a distance equal to ½ the distance between teeth 16a and 16b, it is seen that tooth 16a now underlies, or is closest to, the north pole of magnet 22 and to the south pole of magnet 23, as seen in Fig. 2A. The magnetic circuit of magnet 22 now extends from its north pole, through tooth 16a to bar 25, and through bar 25 to its south pole. The magnetic circuit of magnet 23 now extends from its north pole through bar 24 to tooth 16a, and through 16a to its south pole. The arrows show the direction of the magnetic flux through bars 24 and 25 in Fig. 2A.

A comparison of Figs. 2 and 2A shows that each time a tooth on wheel 10 moves past a stator member 20, a distance equal to ½ the distance between adjacent teeth 16, there is a reversal of flux through bars 24 and 25. This reversal of flux generates an E. M. F. in coils 28 and 29, which is proportional to the time rate of change of flux through the coils.

While a specific relationship between the orientation of the permanent magnets in assembly 21, the orientation of teeth 16, and the direction of movement of member 10 has been illustrated and described, it will be apparent that these factors may be varied to obtain desired operational characteristics. A critical requirement, however, is that the teeth 16 be formed across the outer portion of rim 18 so that when a tooth underlies, or is nearest to stator member 20, that tooth is substantially parallel to a line through a pole of one of the permanent magnets and the opposite pole of the other magnet of assembly 21. In Fig. 2, for example, the line extends from the north pole of magnet 22 to the south pole of magnet 23. Further, the length of the teeth in the direction they extend across rim 18, or the width of rim 18, should at least be such that when a single tooth is under the pole of one magnet and simultaneously the opposite pole of the other magnet in an assembly 21, the tooth length is sufficient so as to underlie both poles to provide a magnetic circuit of substantially minimum reluctance. Additionally, the spacing between adjacent teeth, such as the distance between teeth 16a and 16b, measured in the direction of movement of wheel 10, should be such that when tooth 16a underlies, or is closest to, but a single pole of one of the magnets of assembly 21, an adjacent tooth, such as tooth 16b, will underlie, or be closest to, a single pole of opposite polarity of the other magnet. The width of each tooth measured in the direction of movement of wheel 10 is not critical but should be chosen, for best performance, to provide a magnetic circuit of minimum reluctance.

In Fig. 1 an arrangement of movable member 10 with four equal sized and similarly arranged stator members 20 which are eqiangularly spaced around wheel 10 is illustrated. Teeth 16 are formed in substantially one half the periphery of wheel 10. Voltages are generated in pickup coils, 28, 29 of each stator 20 only when the toothed portion of wheel 10 is passing the stator member. By comparison of the time variations of the voltages generated in each pickup coil of stator 20 it is possible to determine the instantaneous angular position of a given point on wheel 10. The accuracy of the determination will, of course, depend on the number of signal coils used, as well as the arrangement of the teeth formed in wheel 10.

From the foregoing it can be seen that this invention achieves a reversal of the magnetic flux through the bars of the assemblies 21, with the result that the voltages generated in the pickup coil around the bars is greatly increased while permitting simultaneously a reduction in size and weight of the stator members 20.

Obviously many modifications and variations of the present invention are possible in the light of the above teachings. It is, therefore, to be understood that within the scope of the appended claims the invention may be practiced otherwise than as specifically described.

What is claimed is:

1. An A. C. generator comprising a frame, said frame comprising a pair of permanent magnets, a pair of ferromagnetic bars, each of said bars connecting like poles of said magnets, and an insulated conductor wound around at least one of said bars, a member adapted to be rotated relative to said frame about an axis of rotation, said member having a circular peripheral portion of ferromagnetic material, a plurality of equiangularly spaced teeth formed in said peripheral portion and extending transversely of said peripheral portion in a direction substantially parallel to a line through opposite poles of the two magnets in said frame when each tooth in said portion is nearest said frame, the distance between adjacent teeth being such that when one tooth is closest to but a single pole of one of said magnets in said frame, an adjacent tooth is closest to an opposite pole of said second magnet in said frame, and the width of said peripheral portions of said rotatable member at least equalling the greater distance between the poles of one magnet and the opposite poles of the second magnet as measured in a direction parallel to the axis of rotation of said rotatable member.

2. An A. C. generator comprising a rotatable member adapted to be rotated about an axis of rotation, said member having a circular peripheral portion of ferromagnetic material, a plurality of teeth formed on said peripheral portion and equiangularly spaced apart, a frame comprising a pair of permanent magnets and a pair of ferromagnetic bars, said bars connecting like poles of said permanent magnets, said frame being fixedly mounted in space adjacent said peripheral portion of said rotatable member, said teeth extending transversely across said peripheral portion in a direction parallel to a line extending from a pole of one magnet to an opposite pole of the other magnet, the distance between adjacent teeth being such that when one tooth in the rotatable member underlies but a single pole of one of said magnets, an adjacent tooth underlies the opposite pole of said other magnet, and the width of said peripheral portion being at least equal to the greater distance between opposite poles of said magnets as measured in a direction parallel to the axis of rotation of said rotatable member.

3. A reference signal generator comprising a member adapted to be rotated about an axis of rotation, said member having a circular peripheral portion of ferromagnetic material, a plurality of equally spaced teeth formed in a fractional portion of the circumference of said peripheral portion, said teeth extending transversely of said peripheral portion, a plurality of substantially equal sized frames equiangularly and fixedly mounted around said member, and adjacent to said peripheral portion of said member, each of said frames comprising a pair of permanent magnets and a pair of ferromagnetic bars, each bar interconnecting like poles of said magnets, and a coil around at least one of said bars, said teeth extending in a direction substantially parallel to a line through opposite poles of the two magnets in a frame when said tooth is nearest said frame, the distance between teeth being such that when one tooth is closest to a single pole of one magnet in a frame an adjacent tooth will be closest to a pole of opposite polarity of the other magnet of said frame, and the width of said peripheral portion being at least equal to the greater distance between opposite poles of different magnets in each frame, measured in a direction parallel to the axis of rotation of said member.

4. A reference signal generator defined in claim 3 in which the teeth are formed in substantially one-half of the circumference on said peripheral portion.

5. A reference signal generator as defined in claim 4 in which the number of frames is 4.

6. A reference signal generator as defined in claim 5 in which the space between teeth is filled with nonmagnetic material.

7. A reference signal generator comprising a wheel having a circular rim portion of soft ferromagnetic material, said wheel adapted to be rotated about an axis of rotation through the center of said wheel, the rim portion of said wheel lying in the plane of rotation of said wheel, a plurality of equiangularly spaced teeth formed in substantially one-half the periphery of the rim portion of the wheel, said teeth extending transversely across the periphery of the rim portion and parallel to the axis of rotation of said wheel; four frames equiangularly fixed in space adjacent the periphery of the rim portion of said wheel, each of said frames comprising a pair of permanent magnets and a pair of soft ferromagnetic bars, one of said bars connecting like poles of said permanent magnets, the other of said bars connecting the remaining poles of said permanent magnets, and a coil of a conductor around said bars, each of said frames being substantially rectangular in shape, and oriented relative to the periphery of said wheel so that a diagonal through the pole of one magnet and the opposite pole of the other magnet is substantially parallel to the axis of rotation of said wheel, the distance between teeth being such that when one tooth is closest to a single pole of one of the magnets in a frame, an adjacent tooth is closest to a single pole of opposite polarity of the other magnet of said frame, and the length of said teeth in a direction parallel to the axis of rotation being at least equal to the greater distance between the poles of one magnet and the opposite pole of the other magnet of a frame measured in a direction parallel to the axis of rotation.

8. An A. C. generator comprising a frame, said frame comprising a pair of permanent magnets, a pair of ferromagnetic bars, each of said bars connecting like poles of said magnets, and an insulated conductor wound around at least one of said bars, a member adapted to be moved relative to said frame in a given direction, said member having a portion thereof made of ferromagnetic material, a plurality of equal sized and equal spaced teeth formed in said portion of said member and extending transversely of said portion in a direction substantially parallel to a line through opposite poles of the two magnets of said frame when each tooth in said portion is nearest said frame, the distance between adjacent teeth being such that when one tooth is closest to but a single pole of one of said magnets in said frame an adjacent tooth is closest to an opposite pole of said second magnet in said frame, and the width of said portion of said movable member at least equaling the greater distance between the poles of one magnet and the opposite poles of the second magnet as measured in a direction at right angles to the direction of motion of said movable member.

References Cited in the file of this patent

UNITED STATES PATENTS

| | | |
|---|---|---|
| 1,441,019 | Moran | Jan. 2, 1923 |
| 2,116,353 | Klaiber | May 3, 1938 |
| 2,230,508 | Beer | Feb. 4, 1941 |
| 2,446,446 | Wargin | Aug. 3, 1948 |

FOREIGN PATENTS

| | | |
|---|---|---|
| 497,427 | France | Sept. 12, 1919 |